C. F. SMITH.
COMBINED HEADER AND STRIPPER.
APPLICATION FILED NOV. 24, 1914.

1,146,600.

Patented July 13, 1915.

Witnesses
Chas. H. Wagner.
D. R. Partello.

Inventor
Charles F. Smith
By Robt H Robb
Attorneys

UNITED STATES PATENT OFFICE.

CHARLES F. SMITH, OF CARTER, TENNESSEE.

COMBINED HEADER AND STRIPPER.

1,146,600.

Specification of Letters Patent.

Patented July 13, 1915.

Application filed November 24, 1914. Serial No. 873,756.

*To all whom it may concern:*

Be it known that I, CHARLES F. SMITH, a citizen of the United States, residing at Carter, in the county of Carter and State of Tennessee, have invented certain new and useful Improvements in Combined Headers and Strippers, of which the following is a specification.

The present invention relates to that type of agricultural implements designed particularly for manual heading and stripping cane of its fodder or blades, the object in view being to provide a device which will greatly facilitate the laborious operation which has for the most part been heretofore done by hand.

The invention involves a relatively stationary supporting member carrying cutting elements for severing the cane heads, and coacting stripping members or blades between which the cane stalks are manually drawn for the purpose of removing the fodder blades therefrom, said members coöperating yieldingly to permit substantially free passage of each stalk from its smaller to its larger end, as well as involving means for relative adjustment of the stripper members to accord with the general sizes of cane stalks operated upon.

The invention comprises certain novel constructions, combinations and arrangements of parts as will be hereinafter described and claimed.

Figure 1:
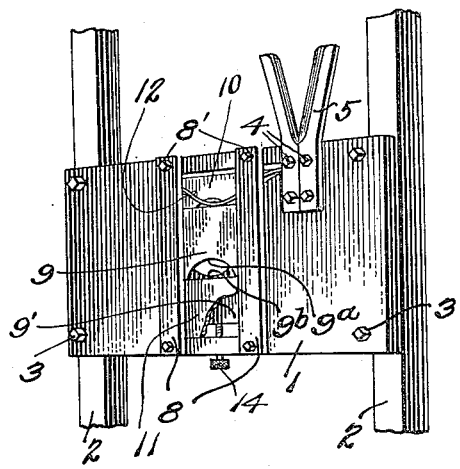
Figure 2:
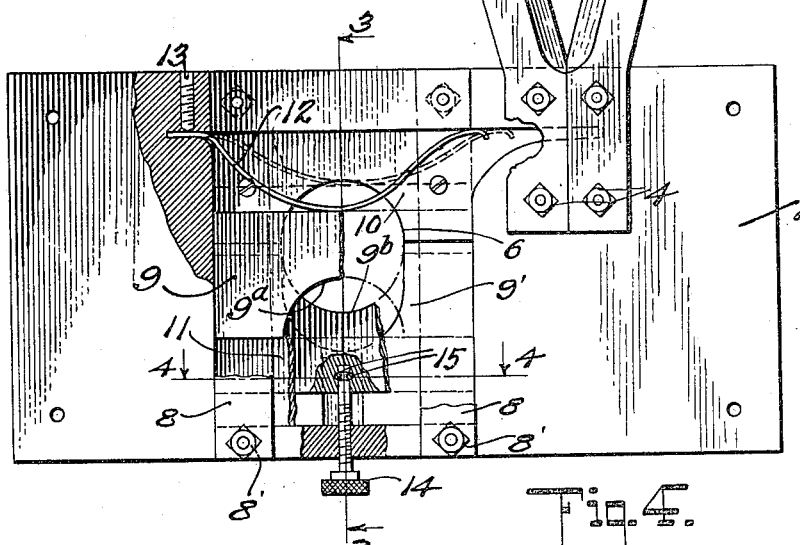
Figure 3:
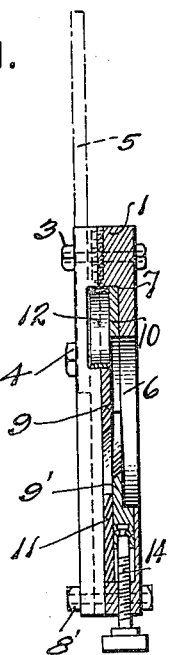
Figure 4:
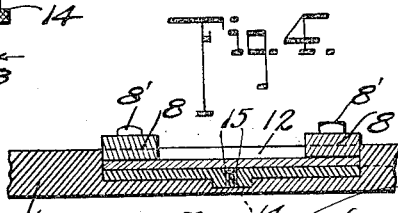

In the drawings: Figure 1 is a perspective view of an embodiment of the invention. Fig. 2 is a side elevation of the device, parts being broken away and shown in section to more clearly disclose the details of construction. Fig. 3 is a vertical sectional view on the line 3—3 of Fig. 2. Fig. 4 is a horizontal, sectional view on the line 4—4 of Fig. 2.

Throughout the following detail description, and on the several figures of the drawings, similar parts are referred to by like reference characters.

Specifically describing the invention, and referring to the drawing, the numeral 1 designates a block or plate of any desired material and general configuration which constitutes the body portion of my device, said plate being preferably secured to spaced standards or posts 2, at any desired height of the latter for convenience, as by means of the bolts, 3. Secured adjacent to the upper edge of the block 1 by means of the fastening members 4 are a pair of cutting elements 5 being arranged with the knife edges thereof converging downwardly toward each other. The block, furthermore, is formed with a central opening 6 of any desired size, but preferably somewhat larger than any stalk which would be likely to be passed through said aperture. The block on one face surrounding the aperture is recessed as indicated at 7 and secured to the face of the block at each side of the recess is a guide strip 8 fastened by means of bolts or similar members 8'. Within the recess 7 over the opening 6 are disposed an upper and a lower stripper member 9, 9' which are arranged to coact with each other as will be more particularly pointed out in the following description.

The stripper member 9 is mounted preferably in front of the lower stripper 9' so as to enable relative sliding action of these members or blades over each other at their contiguous edges, the recess being provided at its upper portion with a spacing member 10 in rear of the member 9, and said recess being likewise provided with a spacing member 11 at its lower portion in front of the member 9', said spacing members corresponding in thickness to the respective stripper blades so as to permit of their proper alinement and easy operation within the recess 7 aforesaid. It will be observed by reference to the drawings that each of the stripper members 9 and 9' at contiguous edges are cut away semicircularly as indicated at $9^a$ and $9^b$, the semicircular edge portion of each being preferably beveled as most clearly indicated in Fig. 3 of the drawing.

It will be obvious that the semicircular cut-away edges of the stripper members present a restricted opening in conjunction with the opening 6 of the plate that will permit of the passage of an object such as a cane stalk therethrough. The size of this opening is more or less primarily controlled by mounting the upper stripper member 9 yieldingly in the recess, as most distinctly shown in Fig. 2 of the drawing. For this purpose, I preferably secure a curved spring 12 at one end in the body of the plate at the upper edge of the recess 7 as by means of a screw 13 or other clamping device. The curved portion of said spring impinges against the upper stripper member and normally holds the same in contact with its coacting lower spacing member 11, the free end of the spring sliding, however, and permitting said stripper member to yield when passing a stalk from its smaller end toward its enlarged end through the device for the purpose of removing the fodder blades therefrom, as will be hereinafter mentioned.

The mounting of the lower relatively stationary stripper blade 9' is such as to control the general size of the opening between the coacting stripper members so that where the cane stalks run large in growth this opening may be made larger as found necessary by means of the adjusting screw 14 which is mounted in the plate beneath the stripper member 9' and connecting at its upper end therewith. The connection may be made detachable by reducing or channeling the upper extremity of the screw 14 and passing horizontally through the blade a pair of pins 15 as clearly shown in Figs. 2 and 4 of the drawing. Thus a wide range of adjustment is provided depending upon the size of stalks which are to be operated upon.

Describing the use of the invention, an operator at one side of the device inserts the top portion of the cane stalk between the blades of the cutter elements 5, severing the head of the cane from the stalk, whereupon the smaller end is inserted through the opening between the stripper members 9 and 9', while the second operator grasping the inserted extremity pulls the stalk through the opening between the stripper elements, and in so doing removes from the stalk the fodder blades. Obviously, the upper spring actuated blade yields as the larger buttend of the stalk passes between the stripper members.

By the use of this simple device, the operation of heading and stripping cane is vastly facilitated and in fact practically the same amount of work may be done by the two operators as would ordinarily be accomplished by some ten men in the usual hand heading and stripping operations. Apparently slight changes may be made in the configuration and arrangement of the parts hereinbefore described without departing from the spirit of the invention and within the scope of the appended claims.

Having thus described my invention, what I claim as new is:

1. In a device of the class described, the combination with a support, of a pair of stalk stripping members mounted thereupon in position to permit of passage of stalks therebetween, means yieldingly holding one of said members in coacting position with respect to the other of said members, and means for adjusting the last mentioned member to regulate the size of the opening therebetween.

2. In a device of the class described, the combination with a support comprising a block having an opening therethrough, coacting stripper members arranged over said opening and having cut-away portions to normally leave a passage between the stripper members, one of said stripper members being relatively stationary and the other of said members being yieldably mounted and an adjusting member connected to the stationary stripper member for moving the same to regulate the size of the block opening and incidentally the passage between the stripper members.

3. In a device of the class described, the combination with a support comprising a block having an opening therethrough, coacting stripper members arranged over said opening and having cut-away portions to normally leave a passage between the stripper members, one of said stripper members being relatively stationary, and an adjusting screw carried by the block and connected with the relatively stationary stripper member for slidably adjusting the same relative to the other member in order to regulate the size of the passage between the said stripper members.

4. In a device of the class described, the combination with a support comprising a block having an opening therethrough, coacting stripper members arranged over said opening and having cut-away portions to normally leave a passage between the stripper members, one of said stripper members being relatively stationary, adjusting means carried by the block and connected with the relatively stationary stripper member for regulating the size of the passage between the said stripper members, the other of said stripper members being slidably mounted with respect to the relatively stationary member, a leaf spring normally slidably bearing against the slidably mounted stripper member to permit yielding of the same, and a fastening member carried by the block detachably holding one end of the spring thereon.

5. In a device of the class described, the combination with a support comprising a block having an aperture therethrough, standards to which said blocks are secured, of a pair of coacting stripper members mounted on the block one behind the other and relatively slidable over each other, said block having a recess to receive said stripper members, guide means adjacent to the recess and holding said stripper members therein, spacing members mounted in the recess to hold the stripper members in proper sliding relation and forming stop means to limit their movements, an adjusting screw connected to one of said stripper members, a spring secured in the recess and coacting with the other of said stripper members for holding the latter in coöperating relation with the first-mentioned stripper member, said stripper members being cut away semicircularly at contiguous edges to form an opening normally therebetween arranged to coact with the opening through the block aforesaid, and cutter elements secured adjacent to the stripper members aforesaid.

In testimony whereof I affix my signature in presence of two witnesses.

CHARLES F. SMITH.

Witnesses:
J. C. COLE,
GEO. W. COLE.

Copies of this patent may be obtained for five cents each, by addressing the "Commissioner of Patents, Washington, D. C."